(12) United States Patent
Hilgenfeld et al.

(10) Patent No.: US 6,391,388 B1
(45) Date of Patent: May 21, 2002

(54) PROCESS FOR PRODUCING CERAMIC MULTICOLORED PRINTS HAVING IMPROVED REPRODUCTION QUALITY AND APPARATUS FOR IMPLEMENTING THE PROCESS

(75) Inventors: Hans Hilgenfeld, Bodenheim; Fritz Diefenbach, Alsbach; Karl Koch, Penzberg, all of (DE)

(73) Assignee: dmc² Degussa Metals Catalysts Cerdec AG, Frankfurt (DE)

( * ) Notice: Subject to any disclaimer, the term of this patent is extended or adjusted under 35 U.S.C. 154(b) by 0 days.

(21) Appl. No.: 09/168,561

(22) Filed: Oct. 9, 1998

(30) Foreign Application Priority Data

Oct. 9, 1997 (DE) .......................... 197 44 484

(51) Int. Cl.⁷ .............................. B05D 1/28; B05D 1/32
(52) U.S. Cl. ..................... 427/279; 427/282; 427/287; 427/397.7; 101/492; 101/494
(58) Field of Search ................. 427/282, 287, 427/256, 279, 466, 469, 397.7; 101/492, 494, 119, 128.4, 129

(56) References Cited

U.S. PATENT DOCUMENTS

| | | | |
|---|---|---|---|
| 4,290,533 A | | 9/1981 | Rupp et al. |
| 4,614,967 A | | 9/1986 | Sayanagi |
| 5,395,414 A | | 3/1995 | Matasick et al. |
| 5,750,299 A | * | 5/1998 | Ohshima et al. |
| 5,913,092 A | * | 6/1999 | Bisaiji et al. |
| 5,927,191 A | * | 7/1999 | Wheatley, Jr. et al. |

FOREIGN PATENT DOCUMENTS

| | | |
|---|---|---|
| DE | 3537008 A1 | 4/1987 |
| DE | 3638170 A1 | 5/1988 |
| DE | 4337648 A1 | 5/1995 |
| EP | 0741490 A1 | 11/1996 |
| WO | 98/49013 * | 5/1998 |

OTHER PUBLICATIONS

Polygraph Praxis, Internationale Empfehlung, Nov. & Dec. 1997, pp. 26–38.
Polygraph Treffpunkt Druckindustrie, Mehr Licht im Farben–Dunkel, Jan. 1996, pp. 22–25.
Erik Wágg and Hans Hilgengfeld, Printing Four–Color–Process Ceramic and Glass Decals, Nov. 1995, Screen Printing.
Harald Küppers, Warum Sieben–Farben–Druck, 1991.

* cited by examiner

*Primary Examiner*—Fred J. Parker
(74) *Attorney, Agent, or Firm*—Wenderoth, Lind & Ponack, L.L.P.

(57) ABSTRACT

A process for producing a multicolored print by employing a color scanner that is capable of being profiled and an electronic image processor. Color data pertaining to color fields are taken as the basis for determining an algorithm for the printable color range and the separation, the color data being generated by employing ceramic colors of a multicolor set that are compatible with one another. With a view to producing four-color prints and also, in particular, seven-color prints that are truer to the original, four-color and seven-color sets as claimed are employed such as were taken as the basis for the color fields for determination of the algorithm. By means of seven-color printing, the color space is extended.

20 Claims, 2 Drawing Sheets

PROCESS FOR PRODUCING CERAMIC MULTICOLORED PRINTS HAVING IMPROVED REPRODUCTION QUALITY AND APPARATUS FOR IMPLEMENTING THE PROCESS

BACKGROUND OF THE INVENTION

The invention relates to a process for producing ceramic multicolored prints, in particular four-color and seven color prints, having improved reproduction quality. The process comprises the stages of colorimetric scanning of an image pattern by means of a color scanner, creation of a print profile and chromatic components by an electronic image processor, production of the print carrier, direct or indirect imprinting of a substrate that is capable of being fired, and firing. The invention is further directed towards an apparatus for implementing the process, the apparatus being special ceramic color sets.

Graphical reproductions are mostly carried out using four-color printing. In Europe the chromatic components and the corresponding printing inks of the four-color set are based on the Euroscale (EN 16538/539). The standardized colors of the four-color set are the chromatic colors yellow (Y), magenta-red (M) and cyan-blue (C) as well as the achromatic color black (S). The chromatic ground colors orange-red (R), violet-blue (B) and green (G) are represented by combining the primary colors Y, M and C. Since the colors underlying the Euroscale are already close to the theoretical color locus, in graphical four-color printing a high quality of reproduction is achieved. Only in rare cases, in particular for the production of graphical reproductions with more luminous colors in the color regions R, B and G, is use made of seven-color printing and the Küppers scale which underlies it (H. Küppers in Der Fadenzähler, a company publication produced by Gebr. Schmidt Druckfarben, Frankfurt, 1991).

In connection with the production of ceramic prints, substantially more unfavorable conditions are obtained in comparison with graphical prints. Namely, the available color palette in respect of ceramic colors is narrower than that for producing graphical reproductions, and the color locus and the intensity of the three ceramic chromatic colors Y, M and C do not correspond to the European standard. Since, as a rule, use has also been made of the Euroscale hitherto in ceramic multicolor printing, a reproduction true to the original was not possible. In addition, in ceramic four-color printing, not only did smears have to be put up with in the case of the ground colors Y, M and C, but even more smear resulted when reproducing luminous colors in the regions R, B and G. Further problems arise in ceramic printing by virtue of the fact that the colors underlying the multicolor set to be used can not only be selected according to their color locus and intensity but, on account of the ceramic firing immediately following the printing, stringent requirements also have to be met regarding the firing stability of the colors, the compatibility of the colors with one another, the compatibility of the colors with the flux, the dishwasher resistance and an emission of lead and cadmium that is as low as possible.

In order to produce ceramic four-color prints having better correspondence of original pattern and reproduction, elaborate corrections were necessary by employing so-called ornamental colors (E. Wagg and H. Hilgenfeld, Screen Printing, November 1995). Color-critical decorative surfaces were left open in the color separation and closed by ornamental colors, in particular those from the R, B and G regions. Such corrections had to be carried out by experienced lithographers.

SUMMARY OF THE INVENTION

It is accordingly an object of the invention to improve the quality of reproduction in the case of ceramic multicolor printing. According to a further object of the invention the color locus of the ceramic colors of the multicolor set to be used should be optimized, and the color space for ceramic multicolored prints should preferably be extended.

The first object is achieved by virtue of a process according to the present invention. The second object is achieved by virtue of the apparatus used for implementing the process, namely multicolor sets for the production of overglaze, inglaze and underglaze decorations on ceramic and porcelain as well as decorations on glass.

A process has been discovered for producing a ceramic multicolored print having improved reproduction quality. The process comprises colorimetric scanning of an image pattern by means of a color scanner that is capable of being profiled, creation of a print profile and issuing of a chromatic component for each color by an electronic image processor, production of a transparency for each chromatic component, production of the print carrier to be employed in the printing process using the transparencies, imprinting of a substrate that is capable of being fired or of an intermediate carrier using the print carriers and ceramic printing inks, and firing in a manner known as such of the directly or indirectly imprinted carrier that is capable of being fired. The process uses an electronic image processor, the algorithm of which, for the printable color range and separation, having been based on color data pertaining to color fields generated from ceramic colors of a multicolor set.

The multicolored print is preferably a four-color or seven-color print. Prints generated in ceramic seven-color printing are distinguished by a hitherto unknown, extended color space and therefore a substantially improved reproduction quality.

Colorimetric scanning of the image pattern and creation of a print profile can be effected by employing a commercially available color scanner that is capable of being profiled, including an electronic image processor that is suitable for such purposes. Software for profiling the scanners is commercially available. Over the course of profiling, the color values of an image point are registered by the scanner and converted into the actual color values by means of a matrix stored in a file of the electronic image processor, which describes the necessary error correction.

A significant feature of the process according to the invention is that color data pertaining to color fields obtained by using colors of a ceramic multicolor set, in particular of a ceramic four-color or seven-color set, were taken as the basis for creation of the computer algorithm for establishing the color space and also the separation of the image points into the special printing inks. For the purpose of creating the stated algorithm, color fields are created from ceramic colors of a multicolor set by combining ground colors that are compatible with one another from the series comprising yellow (Y), magenta (M), cyan-blue (C), red-orange (R), blue-violet (B), green (G) as well as black (S) in various mixing ratios and are gauged with respect to their particular color locus and their intensity. The color data obtained define the color space that can actually be obtained in the course of ceramic printing. The color space was taken as the basis for creating the computer algorithm for the separation. The color data of the several thousand color fields gauged form the support-points of the separation matrix. A programmer who is familiar with four-dimensional matrices and non-linear dependencies is able to ascertain the algorithm for the intermediate values from the support-points.

In current four-color printing the color combination comprises the colors M, Y and C, and in the case of seven-color printing, which results in an extended color space, the color combination comprises the colors M, Y, C, R, B and G and also, in each instance, S. By employing the color data pertaining to an image pattern that have been measured by the scanner and then profiled, and by using a computer algorithm for the separation which is ascertained on the basis of ceramic colors, the print profile that comprises the colors required for each image point and their area ratio is created by the electronic image processor.

Provided that, when printing ceramic colors, use is made of a substantially similar, preferably identical, multicolor set such as was taken as the basis for determining the computer algorithm, printing results are achieved that are substantially truer to the original. Although the problems of ceramic multicolor printing have long been known and elimination of the problems has necessitated elaborate corrections, hitherto use has surprisingly never been made of a separation matrix based on ceramic colors. Such a measure was not obvious because, when establishing a color set, not only the optical aspects but, in addition, aspects regarding the compatibility of the colors with one another, the compatibility of the colors with the fluxing agent, the Pb and Cd emissions, the dishwasher resistance and the potential for misprints had to be taken into account. Accordingly the discovery of suitable color combinations of a color set required the investigation of thousands of combinations.

The issuing or establishment, for each color, of the chromatic components that are improved in accordance with the invention by the electronic image processor, and also, from this, the production of transparencies, are effected in a known manner. By employing the transparencies it is possible, in a known manner, for print carriers to be used in the printing process to be produced, for example templates for screen printing, printing plates for offset printing or engraving plates for dabber printing. The printing itself can be effected directly onto the carrier that is capable of being fired, for instance ceramic, porcelain or glass. In the case of indirect printing, use is mostly made of the known transfer technique, whereby printing of the ceramic colors is effected first by employing the print carriers on transfer paper provided with a layer of glue or wax by way of an intermediate carrier and the decoration is then transferred on the intermediate carrier, generally after a film has been applied over the same, onto the carrier that is capable of being fired. Printing is directly followed by firing, the firing conditions conforming in a known manner to the carrier material and also to the type of decoration, such as overglaze, in-glaze or underglaze, which already has to be taken into account when selecting the multicolor set employed.

DETAILED DESCRIPTION OF THE PREFERRED EMBODIMENT

According to a preferred embodiment of a process according to the invention, multicolor printing is seven-color printing, which hitherto has never been applied for the production of ceramic decorations, since, on account of inadequate quality of the chromatic components hitherto obtainable, four-color printing already required a considerable effort with regard to correction. Through the use of an algorithm for the separation (separation matrix) that is ascertained in accordance with the invention by employing color data of a ceramic seven-color set, chromatic components having substantially improved reproduction quality can be obtained. The reproduction quality of the seven-color printing according to the invention is also improved in relation to the four-color printing according to the invention by employing an optimized four-color set. As a result of transition from ceramic four-color printing to ceramic seven-color printing, the reproducible color space is extended and, in addition, more luminous color tones can be obtained. Thus, for the first time in the case of ceramic decorations, an image quality is now possible such as was unknown hitherto.

Figure 1:
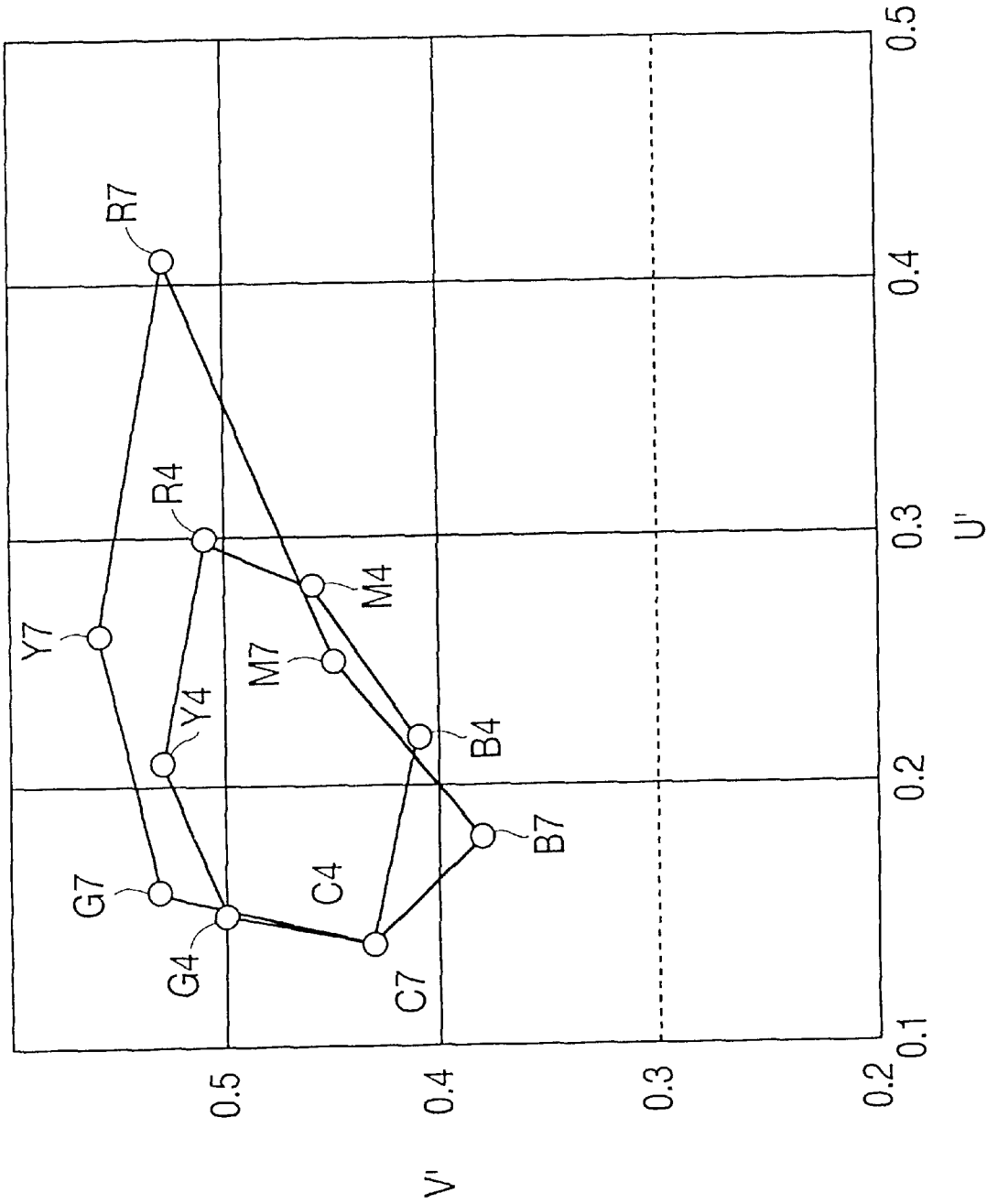
FIG. 1 is a diagram illustrating a representable color space in four-color and seven-color printing.

FIG. 1 shows the representable color space in four-color and seven-color printing in the u', v' system according to DIN 5033, Part 3. Represented are the limiting values for the color set employed in each instance for the overglaze decoration, namely $Y_4$, $M_4$, $C_4$ and $Y_7$, $R_7$, $M_7$, $B_7$, $C_7$, $G_7$ and also the secondary colors $R_4$, $B_4$ and $G_4$ derived from $Y_4$, $M_4$ and $C_4$. By reason of the restricted selection of pigment types available in four-color printing, the color space is smaller than in seven-color printing, where the colors R, B and G are employed in addition to Y, M and C as primary colors. The possibility that appears obvious, given knowledge of the color spaces represented in FIG. 1, namely to extend the color space in four-color printing by an exchange of, for example, $Y_4$ for $Y_7$, is not possible, because $M_4$ is not compatible with $Y_7$, since only grimy orange tones are obtained with this combination.

Figure 2:
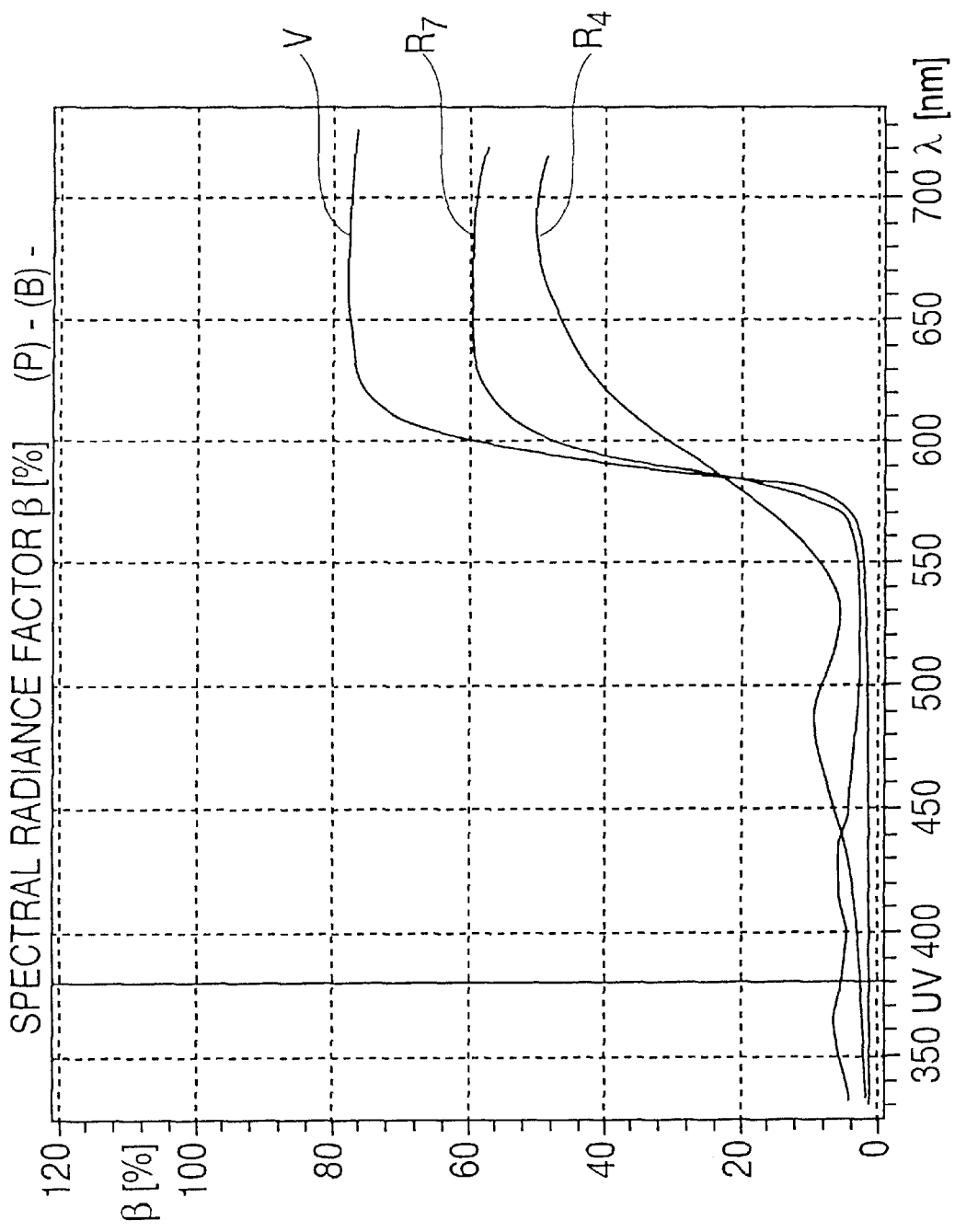
FIG. 2 is a graph of reflectance curves for the color orange-red based on the Euroscale.

FIG. 2 shows reflectance curves for the color orange-red, represented in ceramic four-color and seven-color printing in comparison with the printed pattern printed with organic colors, based on the Euroscale. Curve V corresponds to the pattern, curve $R_4$ corresponds to four-color printing and curve $R_7$ corresponds to ceramic seven-color printing. The improvement in the reproduction quality in the transition from ceramic four-color printing to seven-color printing is clearly evident.

The ceramic color sets according to the invention constitute particularly suitable means for implementing the process. The individual colors consist essentially of the coloring pigment or pigment mixture and a conventional glass flux that is matched to the firing conditions, consisting essentially of one or more glass frits. If desired, the number of colors of a color set can be reduced by one chromatic color. The pigments of the color sets are matched to the firing conditions and the form of application: whereas, for example, in the course of firing a print on glass in the range from, ordinarily, 500 to 650 ° C., use can be made of cadmium sulfide as Y, in the case of an in-glaze or underglaze decoration on ceramic or porcelain, the firing of which is ordinarily effected in the range from 950 to 1200 ° C., a pigment that is more temperature-stable than CdS, such as zirconium-praseodymium yellow, can be employed. Pigments for the overglaze decoration on ceramic and porcelain have to be color-stable in the temperature range from, in general, 750 to 900 ° C. with normal firing or, in the case of high-temperature fast firing, at a temperature above this range.

The combination of the colors of a color set according to the invention comprises, by way of pigment components, in addition to a black pigment based on spinel, colored pigments on the following basis:

(i) for the overglaze decoration in four-color printing, $Pb_2Sb_2O_7$ as yellow (Y), $Co(Al, Cr)_2O_4$ as cyan-blue (C) and Ag-containing gold purple as magenta (M);
  (ii) for the overglaze decoration in seven-color printing, CdS as Y, $Cr_2O_3$/CdS as green (G), $Co(Al, Cr)_2O_4$ as C, $CoAl_2O_4$/gold-purple as blue-violet (B), Ag-free gold purple as M and Cd(S, Se) as orange-red (R);
  (iii) for the in-glaze or underglaze decoration in four-color printing, zirconium-praseodymium yellow as Y, zirconium-vanadium blue as C and Cr-doped CaSnSiO. (sphene type) as M;
  (iv) for the in-glaze or underglaze in seven-color printing, zirconium-praseodymium yellow as Y, $Cr_2O_3$/CO$(OH)_2$ with a Co/Cr atomic ratio in the range from 0.15 to 0.25 as G, zirconium-vanadium blue as C, Co silicate or CoO in glass as B, Cr-doped $CaSnSiO_5$ (sphene type) as M and inclusion pigment Cd(S, Se) in $ZrSiO_4$ as R;
  (v) for the glass decoration in four-color printing, CdS as Y, Co $(Al, Cr)_2O_4$ as C and Cd(S, Se) as M; and
  (vi) for the glass decoration in six-color printing, CdS as Y, $Co(Al, Cr)_2O_4$/CdS as G, $Co(Al, Cr)_2O_4$ as C, (Co, Zn) silicate as B and Cd(S, Se) as M.

As already explained in detail, in addition to good color values, the colors of each color set according to the invention are each distinguished by good compatibility of the colors with one another, good compatibility with the fluxing agent contained in the color, high dishwasher resistance and low Cd and Pb leakage.

Some of the improvement in the reproduction quality in the green and magenta region for the in-glaze and underglaze decoration in seven-color printing was able to be achieved by means of new printing inks. The green color consists of a glass frit as a fluxing agent and $Cr_2O_3$ in combination with $Co(OH)_2$ as pigment, the Co/Cr atomic ratio lying in the range from 0.15 to 0.25. In the case of magenta, it is a question of a Cr-doped $CaSiO_5$ (sphene type) which was optimized with respect to the color locus.

By using a ceramic seven-color set that is matched to the firing temperature, taking the set as the basis for creating the algorithm for the separation, decorations can be obtained having further improved reproduction quality.

EXAMPLE a) For the following example, a multicolor set is used for an overglaze decoration with the colors yellow (No. 13651), magenta (No. 77567), cyan (No. 121522) and black (No. 14209) (the numbers are product-numbers of Cerdec AG).

Using these colors, color fields were produced in various mixing ratios of the printing inks and were gauged calorimetrically. The measured data served as support points for determining the computer algorithm for the separation. A color scanner capable of being profiled was employed having an electronic image processor and suitable software (Color Management Software Color Blind®, available from Color Solutions Inc. Europe). An image pattern was scanned and the print profile was created therefrom by the image processor. By taking the separation matrix stored in the electronic image processor as a basis, chromatic components were produced from the print profile. Subsequently, transparencies and screen-printing templates were produced in a known manner and ceramic glazed with these was imprinted using the stated ceramic color set and fired. Four-color prints were obtained having a high reproduction quality.

b) In a manner analogous to a) the scanner was calibrated with the following seven-color set: yellow (No. 13884), green (No. 111234), cyan (No. 121522), blue-violet (No. 721233), magenta (No. 77505), red-orange (No. 17891) and black (No. 14209) (the stated numbers are product-numbers of Cerdec AG). Using a scanner calibrated in this way, by employing the same printing inks an image quality was obtained that was further improved—that is to say, truer to the original—in comparison with a).

What is claimed is:

1. A process for producing a ceramic multicolored print, comprising:
    colorimetric scanning an image pattern with a scanner that is capable of being profiled;
    creating a print profile and establishing a chromatic component for each color with an electronic image processor having an algorithm which, for the printable color range and separation, is based on color data pertaining to color fields generated from ceramic colors of a multicolor set;
    producing a transparency for each chromatic component;
    producing a print carrier to be employed in printing using the transparency;
    imprinting onto a carrier either directly or indirectly using the print carrier and ceramic printing inks, wherein in the case of indirect printing onto the carrier, the print carrier is imprinted onto an intermediate carrier and then the intermediate carrier is used to imprint the carrier; and
    firing the carrier.

2. The process of claim 1, wherein the color fields are produced using ceramic colors that are compatible with one another under firing conditions and selected from a group comprising magenta, yellow, cyan, red-orange, blue-violet, green and black.

3. The process of claim 2, wherein identical ceramic colors are used to generate the color fields and to imprint the carrier or the intermediate carrier.

4. The process of claim 3, wherein the image pattern is reproduced as a four-color print by using ceramic colors compatible with one another with colors magenta, yellow, cyan-blue, and black.

5. The process of claim 3, wherein the image pattern is reproduced as a seven-color print by using ceramic colors compatible with one another with colors magenta, yellow, cyan-blue, red-orange, blue-violet, green, and black.

6. The process of claim 2, wherein the image pattern is reproduced as a four-color print by using ceramic colors compatible with one another with colors magenta, yellow, cyan-blue, and black.

7. The process of claim 2, wherein the image pattern is reproduced as a seven-color print by using ceramic colors compatible with one another with colors magenta, yellow, cyan-blue, red-orange, blue-violet, green, and black.

8. The process of claim 2, wherein the ceramic colors of a multicolor set are selected from the group consisting of overglaze colors, inglaze colors, underglaze colors, and glass colors.

9. The process of claim 1, wherein identical ceramic colors are used to generate the color fields and to imprint the carrier or the intermediate carrier.

10. The process of claim 9, wherein the image pattern is reproduced as a four-color print by using ceramic colors compatible with one another with colors magenta, yellow, cyan-blue, and black.

11. The process of claim 9, wherein the image pattern is reproduced as a seven-color print by using ceramic colors compatible with one another with colors magenta, yellow, cyan-blue, red-orange, blue-violet, green, and black.

12. The process of claim 9, wherein the ceramic colors of a multicolor set are selected from the group consisting of overglaze colors, inglaze colors, underglaze colors, and glass colors.

13. The process of claim 1, wherein the image pattern is reproduced as a four-color print by using ceramic colors compatible with one another with colors magenta, yellow, cyan-blue, and black.

14. The process of claim 13, wherein the ceramic colors of a multicolor set are selected from the group consisting of overglaze colors, inglaze colors, underglaze colors, and glass colors.

15. The process of claim 1, wherein the image pattern is reproduced as a seven-color print by using ceramic colors compatible with one another with colors magenta, yellow, cyan-blue, red-orange, blue-violet, green, and black.

16. The process of claim 15, wherein the ceramic colors of a multicolor set are selected from the group consisting of overglaze colors, inglaze colors, underglaze colors, and glass colors.

17. The process of claim 1, wherein the ceramic colors of a multicolor set are selected from the group consisting of overglaze colors, inglaze colors, underglaze colors, and glass colors.

18. The process of claim 1, wherein the ceramic colors of a multicolor set comprises one color representing black on the basis of spinel and a plurality of chromatic ceramic colors, wherein each of the ceramic colors consist essentially of one or more pigments and a glass flux consisting essentially of one or more glass frits, and wherein pigments of the plurality of chromatic ceramic colors pigment combination, matched to firing conditions and a form of application of a print, selected from the group consisting of:

(i) CdS as yellow, $Cr_2O_3$/CdS as green, $Co(Al, Cr)_2O_4$ as cyan-blue, $CoAl_2O_4$/gold-purple as blue-violet, Ag-free gold purple as magenta and Cd (S, Se) as orange-red for overglaze decoration in seven-color printing;

(ii) zirconium-praseodymium yellow as yellow, zirconium-vanadium blue as cyan-blue and Cr-doped $CaSnSiO_5$ (sphene type) as magenta for inglaze or underglaze decoration in four-color printing;

(iii) zirconium-praseodymium yellow as yellow, $Cr_2O3$/$Co(OH)_2$ with a Co/Cr atomic ratio in the range from 0.15 as green, zirconium-vanadium blue as cyan-blue, Co silicate or CoO in glass as blue-violet, Cr-doped CaSnSiO, (sphene) type as magenta, and inclusion pigment Cd (S, Se) in $ZrSiO_4$ as orange-red for inglaze or underglaze decoration in seven-color printing;

(iv) CdS as yellow, $Co(Al, Cr)_2O_4$ as cyan-blue, and Cd(S, Se) as magenta for glass decoration in four-color printing; and (v) CdS as yellow, Co $(Al, Cr)_2O_4$/CdS as green, $Co(Al, Cr)_2O_4$ as cyan-blue, (Co, Zn) silicate as blue-violet and Cd(S, Se) as magenta for glass decoration in six-color printing.

19. The process of claim 1, wherein said producing the print carrier to be employed in printing comprises producing one of the following: a template for screen printing, a printing plate for offset printing, and an engraving plate for dabber printing.

20. The process of claim 1, wherein the carrier which is fired is made from at least one of a ceramic material, a porcelain material, and a glass material.

\* \* \* \* \*